(12) United States Patent
Ducarre

(10) Patent No.: US 9,815,265 B2
(45) Date of Patent: Nov. 14, 2017

(54) MULTILAYER ELEMENT COMPRISING A REINFORCING MATERIAL COMBINED WITH A SUPPORT LAYER BY MEANS OF AN ELECTROSTATIC LINK

(71) Applicant: Hexcel Reinforcements, Dagneux (FR)

(72) Inventor: Jacques Ducarre, Corbelin (FR)

(73) Assignee: Hexcel Reinforcements, Dagneux (FR)

( * ) Notice: Subject to any disclaimer, the term of this patent is extended or adjusted under 35 U.S.C. 154(b) by 99 days.

(21) Appl. No.: 14/889,027

(22) PCT Filed: May 26, 2014

(86) PCT No.: PCT/FR2014/051221
§ 371 (c)(1),
(2) Date: Nov. 4, 2015

(87) PCT Pub. No.: WO2014/191667
PCT Pub. Date: Dec. 4, 2014

(65) Prior Publication Data
US 2016/0288476 A1    Oct. 6, 2016

(30) Foreign Application Priority Data

May 30, 2013    (FR) ..................................... 13 54954

(51) Int. Cl.
*B29B 11/16*        (2006.01)
*B32B 5/12*         (2006.01)
(Continued)

(52) U.S. Cl.
CPC ............. *B32B 37/26* (2013.01); *B29B 11/16* (2013.01); *B29C 70/202* (2013.01); *B32B 5/12* (2013.01); *B32B 27/36* (2013.01); *B29K 2077/00* (2013.01); *B29K 2105/0085* (2013.01); *B29K 2105/0881* (2013.01); *B29K 2307/04* (2013.01); *B32B 2037/0092* (2013.01);
(Continued)

(58) Field of Classification Search
None
See application file for complete search history.

(56) References Cited

U.S. PATENT DOCUMENTS 5,593,738 A * 1/1997 Ihm .................... B01D 69/10
                                                427/209
6,503,856 B1   1/2003 Broadway et al.
(Continued)

FOREIGN PATENT DOCUMENTS

EP     1125728        8/2001
FR     2988639 A1     10/2013
(Continued)

*Primary Examiner* — Tahseen N Khan
(74) *Attorney, Agent, or Firm* — W. Mark Bielawski; David J. Oldenkamp

(57) ABSTRACT

The present invention concerns a multilayer element comprising a reinforcing material suitable for producing composite parts combined on at least one of the faces of same with a support layer characterized in that the reinforcing material and the support layer are combined by means of electrostatic forces, and a method for preparing such a material and a method for producing a composite part produced from at least one reinforcing material obtained from such an element, after having removed the support layer.

7 Claims, 2 Drawing Sheets

(51) Int. Cl.
*B32B 27/36* (2006.01)
*B32B 37/26* (2006.01)
*B29C 70/20* (2006.01)
*B29K 77/00* (2006.01)
*B29K 105/00* (2006.01)
*B29K 105/08* (2006.01)
*B29K 307/04* (2006.01)
*B32B 37/00* (2006.01)

(52) U.S. Cl.
CPC ..... *B32B 2037/268* (2013.01); *B32B 2305/08* (2013.01); *B32B 2307/206* (2013.01); *B32B 2307/21* (2013.01); *B32B 2313/04* (2013.01); *B32B 2377/00* (2013.01)

(56) References Cited

U.S. PATENT DOCUMENTS

| | | | |
|---|---|---|---|
| 6,828,016 | B2 | 12/2004 | Mitani et al. |
| 2003/0008125 | A1 | 1/2003 | Delanoy et al. |
| 2006/0003133 | A1 | 1/2006 | Johnson et al. |
| 2008/0295955 | A1* | 12/2008 | Cawse ................ B32B 5/22 156/276 |
| 2010/0068518 | A1* | 3/2010 | Honma ................ B29C 70/086 428/401 |
| 2011/0017867 | A1* | 1/2011 | Simmons ................ C08J 5/24 244/1 A |
| 2011/0088923 | A1* | 4/2011 | Cawse ................ B32B 5/22 174/2 |
| 2011/0091718 | A1* | 4/2011 | Cawse ................ B32B 5/22 428/323 |
| 2011/0091719 | A1* | 4/2011 | Cawse ................ B32B 5/22 428/323 |
| 2011/0174522 | A1* | 7/2011 | Simmons ................ B32B 5/26 174/122 R |
| 2012/0015135 | A1 | 1/2012 | Beraud et al. |
| 2012/0015167 | A1 | 1/2012 | Beraud et al. |
| 2015/0050450 | A1 | 2/2015 | Beraud et al. |

FOREIGN PATENT DOCUMENTS

| | | |
|---|---|---|
| WO | 00/58083 | 10/2000 |
| WO | 2006/121961 | 11/2006 |
| WO | 2007/015706 | 2/2007 |
| WO | 2010/046609 | 4/2010 |
| WO | 2010/061114 | 6/2010 |

* cited by examiner

MULTILAYER ELEMENT COMPRISING A REINFORCING MATERIAL COMBINED WITH A SUPPORT LAYER BY MEANS OF AN ELECTROSTATIC LINK

The present invention relates to the technical field of reinforcing materials suitable for making composite parts. More precisely, the invention relates to associating a reinforcing material with a support layer by electrostatic bonding.

Composite parts or articles, i.e. that comprise firstly one or more fiber sheets or pieces of fiber reinforcement and secondly a matrix (which is usually mainly of thermosetting type and may include thermoplastics), may be fabricated, for example, by a method that is said to be "direct" also known as liquid composite molding (LCM). A direct method is defined by the fact that one or more pieces of fiber reinforcement are used in the "dry" state (i.e. without the final matrix), with the resin or matrix being provided subsequently, e.g. by injection into a mold containing the fiber reinforcement (a method known as resin transfer molding (RTM)), by infusion through the thickness of the fiber reinforcement (the liquid resin infusion (LRI) method or the resin film infusion (RFI) method), or indeed by manually coating and/or impregnating by means of a roller or a paintbrush each of the individual layers of the fiber reinforcement, which layers are applied in succession onto a shaper.

Indirect methods make use of reinforcing materials of preimpregnated type, including the quantity of resin that is needed for making the final part.

Various reinforcing materials are available for use in such methods. Such materials may be of woven, non-woven, or unidirectional type, they may include one or more layers, and they may optionally include a large amount of thermoplastic or thermosetting binder. The Applicant has in particular made proposals for intermediate materials comprising a sheet of unidirectional fibers, in particular carbon fibers, that is associated by adhesive on each of its faces with a non-woven fabric of thermoplastic fibers, referred to below as webbed UD. These reinforcing materials are described in prior patent applications WO 2010/046609 and WO 2010/061114.

When possible, such reinforcing materials are delivered on their own in the form of a reel or roll, without being associated with a support layer that might make them easier to manipulate. This makes it possible to reduce waste and to simplify the laying devices that are used since they do not need to have devices for separating the support layer and for rewinding it.

Nevertheless, in certain specific applications, the Applicant has found that there continues to be a need to have a support layer. This applies in particular for wide strips of reinforcing material that are for cutting out. Present-day machines that lay wide sheets generally manage cutting by using an ultrasonic knife. Such machines use the support film as a cutting anvil. Such machines can produce straight cuts (at 90° to the fibers if they are unidirectional) without a support film, but arbitrary (zigzag) cuts are not possible. This is unacceptable for making use on an industrial scale of reinforcing materials that include wide unsupported unidirectional sheets, since waste management is of great importance economically and is directly associated with managing cutting.

Certain machines that are designed exclusively for managing preimpregnated unidirectional sheets can nevertheless accommodate unidirectional sheets that are said to be "dry" (i.e. that have no more than 10% by weight of binder), providing they are delivered with a support film.

In this context, the Applicant began by attempting to laminate its webbed UD material with various types of support film by applying heat, so as to use the adhesive nature of thermoplastic webs when hot. The Applicant then encountered difficulties associated with adjusting the heating temperature during lamination. If the temperature used is too high, it then becomes impossible to separate the reinforcing material from the support film. In contrast, if the temperature used is too low, then no bonding occurs.

Furthermore, the Applicant has observed that lamination by heating presents certain major drawbacks:

The original reinforcing material is modified. The conditions used during lamination (heating temperature, pressure, cooling) do not necessarily correspond to requirements for producing the original material. For example, while it is cooling, the reinforcing material is in contact with the surface of the support film, which will therefore make its imprint on the surface of the reinforcing material so that it ends up with a structure that is different from its original structure.

The heating temperatures associated with the binder used for lamination can be very high, and thus incompatible with numerous support films. The risk of the reinforcing material being polluted by components coming from the support is then considerable, thereby greatly reducing the range of films that are suitable.

Those difficulties clearly reveal the need to find a substitute for lamination by heating, when using reinforcing material that includes a binder, or more generally the advantage of proposing a novel method of associating reinforcing material with a support layer that is easy to implement and that does not lead to any degradation of the initial reinforcing material, while serving to facilitate manipulating and cutting the reinforcing material.

In this context, the present invention proposes a multilayer element comprising reinforcing material adapted to making composite parts, and a support layer. In the context of the invention, the reinforcing material is associated on at least one of its faces, and in particular on only one of its faces, with a support layer, which association may be provided by electrostatic forces.

Bonding in this way between the reinforcing material and the support layer makes it possible to preserve the integrity of the original reinforcing material and does nothing to degrade its initial properties. Under the action of electrostatic charges, in the context of the invention, an attraction bond is created between the reinforcing material and the support layer, giving rise to electrostatic bonds. This bond is strong enough to hold the support layer in position on the reinforcing material, in particular during manipulation and cutting operations, while subsequently making it easy to peel the two components apart so as to be able to position the reinforcing material when subsequently making a composite part. Bonding in this way, which does not make use of any heating, makes it possible to widen the range of support layers that can be used, by eliminating constraints in terms of temperature stability and risks of polluting the reinforcing material.

The invention is particularly advantageous when the reinforcing material does not present an adhesive nature over temperatures in the range 18° C. to 25° C., thus making it impossible to associate it with the support layer by adhesion at ambient temperature by making use of residual tackiness. Also, and in preferred manner, the reinforcing material does not include thermosetting material or it includes thermosetting material representing no more than 10% of the total weight of the reinforcing material. In particular, the reinforcing material is constituted by reinforcing fibers only, or by reinforcing fibers and a thermoplastic material, with the weight of the thermoplastic material then representing no more than 10% of the total weight of the reinforcing material and preferably representing 0.5% to 10% of the total weight of the reinforcing material, and more preferably 2% to 6% of the total weight of the reinforcing material. It is nevertheless possible for the invention to be applied to reinforcing materials of the preimpregnated type that present a larger quantity of thermoplastic material or of thermosetting material. By avoiding adhesion by heating, the invention makes it possible to preserve the integrity of the original material without leading to remelting of any thermoplastic binder(s) that may be present.

In particular, in the context of the invention, the reinforcing material may comprise one or more woven, non-woven, or unidirectional material fabrics. In particular, the reinforcing material may comprise one or more woven, non-woven, or unidirectional material fabrics made of reinforcing fibers, and in particular of carbon fibers. The element of the invention is said to be "multilayer" since it comprises a layer of reinforcing material and a support layer. It is also possible for the reinforcing material itself to comprise one or more layers that are bonded together by any appropriate means.

The invention is applicable to any type of reinforcing material suitable for making composite parts. Such materials are based in particular on fibers made of glass, carbon, aramid, or ceramics.

The invention is particularly adapted to reinforcing materials constituted by sheets of unidirectional carbon fibers that are bonded on both of their faces to thermoplastic binders, in particular of the non-woven fabric type made of thermoplastic fibers. Such reinforcing materials are described in particular in the following documents: EP 1 125 728; U.S. Pat. No. 6,828,016; WO 00/58083; WO 2007/015706; WO 2006/121961; and U.S. Pat. No. 6,503,856; and in the following patent applications in the name of the Applicant: WO 2010/046609 and WO 2010/061114, to which reference may be made for further details.

In the context of the invention, the support layer is preferably made of an electrically insulating material. In particular, the support layer presents resistivity lying in the range $10^8$ ohm meters ($\Omega \cdot m$) to $10^{17}$ $\Omega \cdot m$, and preferably in the range $10^{10}$ $\Omega \cdot m$ to $10^{17}$ $\Omega \cdot m$. Such measurements are performed in particular at 20° C. with 0% relative humidity, preferably in compliance with IEC standard 60093: 1980. The greater the resistivity, the stronger and more durable the adhesion between the support layer and the reinforcing material. In particular, the support layer may be a polymer, preferably selected from thermoplastic polymers such as polyamide, e.g. polyethylene terephthalate, copolyamides, polyesters, copolyesters, or cellulose, cotton, natural silk, or artificial fibers.

By way of example, the support layer may be a film, a paper, or a textile, or any type of layer that performs the support role, i.e. that facilitates handling and cutting. Advantageously, the support layer presents thickness lying in the range 10 micrometers ($\mu m$) to 500 $\mu m$.

Adhesion between the support layer and the reinforcing material must be sufficient to hold those two elements in position. In the context of the invention, the electrostatic forces serving to associate the reinforcing material and the support layer preferably correspond to a peeling force of 50 millinewtons (mN) to 1000 mN. The electrostatic forces serving to associate the reinforcing material and the support layer correspond, in particular, to a residual charge of voltage lying in the range 0.1 kilovolts (kV) to 3 kV. The electrostatic forces also persist well over time. Even though an electrostatic force reduction can be observed immediately after charge has been generated at the interface between the reinforcing material and the support layer, with the force going down to a value lying in particular in the range 0.1 kV to 3 kV, thereafter, there is no longer any significant reduction in the force of adhesion. In particular, excellent stability is then observed while the multilayer element is being stored for one month in the form of a roll or a reel. In contrast, it is very easy to separate the two portions by a peeling action. It is also observed that they have a clear tendency to reassociate after peeling, but with attraction being reduced on each reassociation and/or peeling cycle.

Advantageously, the multilayer element is in the form of a strip of width greater than or equal to 50 millimeters (mm). The invention is particularly advantageous when such wide strips need to be cut, since the support is then essential. Such strips having a length of several meters can be stored in particular in the form of rolls. Multilayer elements of the invention are entirely suitable for being used on laying machines having means capable of performing complex cutting.

The present invention also relates to a method of fabricating a multilayer element of the invention in which the reinforcing material and the support layer are associated by subjecting the multilayer element to a static electricity generator.

For that purpose, a stack of the support layer and the reinforcing material in contact with each other is placed in an electric field, e.g. generated by applying a voltage in the range 10 kV to 50 kV, and preferably in the range 15 kV to 30 kV. In the context of the invention, the support layer and the reinforcing material are thus associated without applying heat or pressure.

In conventional manner, the electrostatic field is generated between a conductive bar connected to a positive voltage generator and a conductive bar connected to ground. The stack may be positioned equally well with the reinforcing material facing the conductive bar connected to the positive voltage generator or to the conductive bar connected to ground.

Finally, the invention also provides a method of fabricating a composite part made from at least one reinforcing material obtained from a multilayer element of the invention after removing the support layer. Usually, the support layer is removed after performing a cutting operation on the multilayer element, in particular in a direction that is not parallel to its width. Conventional stacking techniques are performed as are conventional techniques of injecting or infusing resin, in the event that the reinforcing material does not contain a sufficient quantity of thermoplastic and/or thermosetting material. For further details on the techniques that can be used, reference may be made to patent application WO 2010/046609.

The examples given below with reference to the accompanying figures, serve to illustrate the invention, but they have no limiting character.

EXAMPLES

Figure 1:
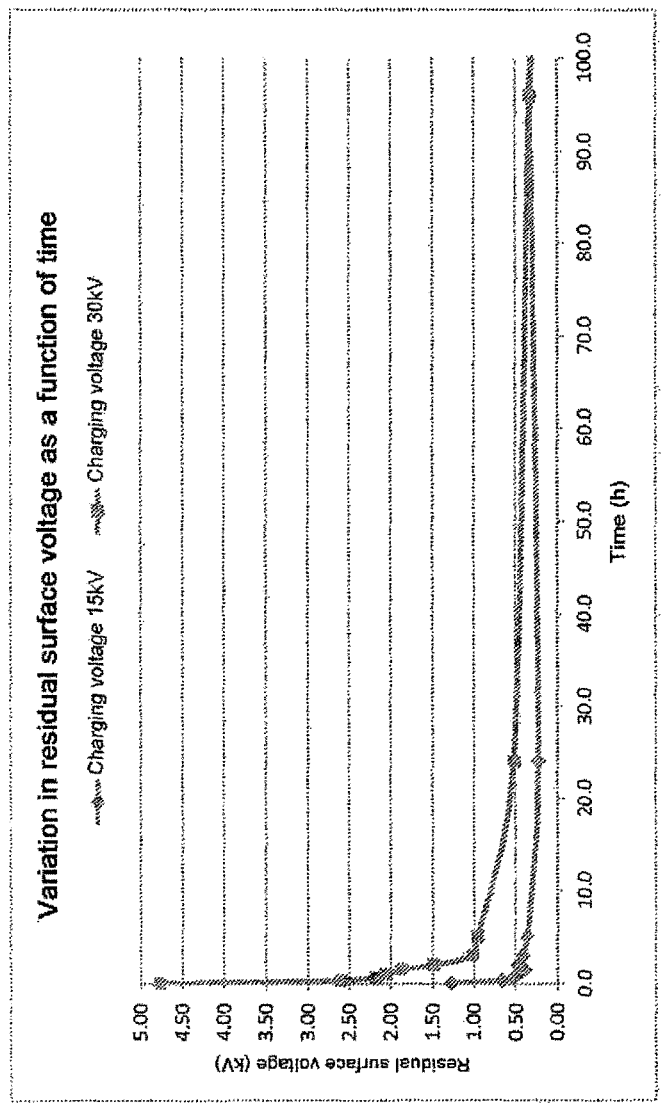
FIG. 1 shows the results of voltage measurements.

Multilayer elements of the invention were fabricated using:

a reinforcing material constituted by a sheet of unidirectional carbon fibers (sold by the supplier Hexcel Corporation under the reference HT40 and presenting a weight of 150 grams per square meter (g/m$^2$)) bonded on each of its faces to a web of copolyamide fibers having a thickness of 118 μm and weighing 6 g/m$^2$ (sold by the supplier Protechnic, 41, avenue Montaigne, 68700 Cernay, France, under the reference 1R8D06, at 3 g/m$^2$). Bonding was performed by heat using the adhesive nature of the thermoplastic web when hot, and was performed in compliance with the method described on pages 27 to 30 of application WO 2010/046609;

a support layer constituted by a film of polyethylene terephthalate (sold under the reference PEPOLIT 150.8 by the supplier Effegidi International S.p.A, Via Provinciale per Sacca, 55, 43052 Colorno (Parma) Italy) having a thickness of 75 micrometers.

Charges generation, and thus obtaining association with electrostatic force, were performed on samples of 150 mm×150 mm constituted by such a reinforcing material superposed with such a support layer.

For this purpose, two unwinders were used:
one supporting the plastics film; and
another supporting the reinforcing material.

The two sheets were guided and positioned one onto the other. It is important to establish contact between the two sheets as well as possible prior to entering the zone in which charge is created and thus in which electrostatic bonding occurs.

Description of Procedures

Association by Creating Electrostatic Charge

Use was made of a 0-30000V Fraser 7300P positive voltage generator (suitable for supplying a voltage that is adjustable over the range 0 to 30 kV at a current of 1 milliamps (mA)) and having a 7080 static electricity generator bar with a length of 300 mm (supplier Boussey Control). That bar gives off electricity from the generator in the form of a cloud of ions. The bar was positioned 25 mm above the sample. Beneath the sample, a conductive plate (aluminum angle bar) having a length of 140 mm was positioned and connected to ground, which bar extended parallel to the electricity generator bar. The conductive plate was also situated at 25 mm from the sample, which was thus at equal distances from the electricity generator bar and the conductive plate. The length of the conductive plate was selected so as to avoid projecting beyond the width of the sample, in order to avoid creating a preferred flow of ions between the bar and the plate.

The sample was supported on two very fine nylon yarns, tensioned using a weight of 700 grams (g), so as to be positioned parallel to the bar and to the conductive plate. The conductive material could equally well face the generator bar or the conductive plate.

The voltage selected for the generator was applied continuously for 10 seconds (s). The bar created a cloud of ions that was picked up by the outside face of the plastic film (beside the generator bar). On the opposite face (beside the reinforcement sample), a mirror image of the charges was formed. The plastics film constituted a barrier that retained the positive charge and that was thus attracted by the negative charge of the mirror image. The film was thus "stuck" against the reinforcing material by attraction between the positive and negative charges. Such attraction occurs once the applied voltage is greater than or equal to 15 kV.

Measuring the Residual Charge Voltage

The residual charge voltage on the sample was measured using a Fraser 715 static voltage measuring appliance. The measurements were performed in compliance with the manufacturer's recommendations, with calibration remote from a charged source, grounding, and then pointing orthogonally relative to the sample at a distance of 100 mm.

Measuring the Peeling Force

The sample was fastened on a plane support by means of double-sided adhesive tape in contact with the reinforcing material. A small rigid bar of width equal to the width of the film was fastened to one end of the plastics film in such a manner that the bar was perpendicular to the direction of the unidirectional fibers. A beaker was secured to the bar; water was poured progressively into the beaker using a pipette until the film separated from the reinforcing material. The unit comprising the bar, the beaker, and the water was then weighed.

Results of Measuring Surface Voltage

In order to perform the test, two series of six samples were produced, one at 15 kV and the other at 30 kV.

The samples were all produced at the same time and manipulated only once, so as to be positioned on two tensioned nylon yarns providing support.

The residual voltages were measured at defined time intervals.

Regularly, a sample was taken in order to subject it to a peel strength test. Since that test is destructive, the number of samples diminished over time.

FIG. 1 shows the results of voltage measurements on the samples averaged for each reading. It can thus be seen that the size of the population diminished regularly over time (from six individuals to one individual).

It can thus be seen that the surface voltage drops considerably in the first few minutes after charging, regardless of whether the applied voltage was 15 kV or 30 kV. Thereafter, the voltage stabilized asymptotically around a value close to 0.3 kV, with this applying for both initial charge values.

Results of Surface Voltage Measurements

Certain measurements were performed on samples that had aged for several hours, whereas others were taken a few minutes after the charge generation step.

Figure 2:
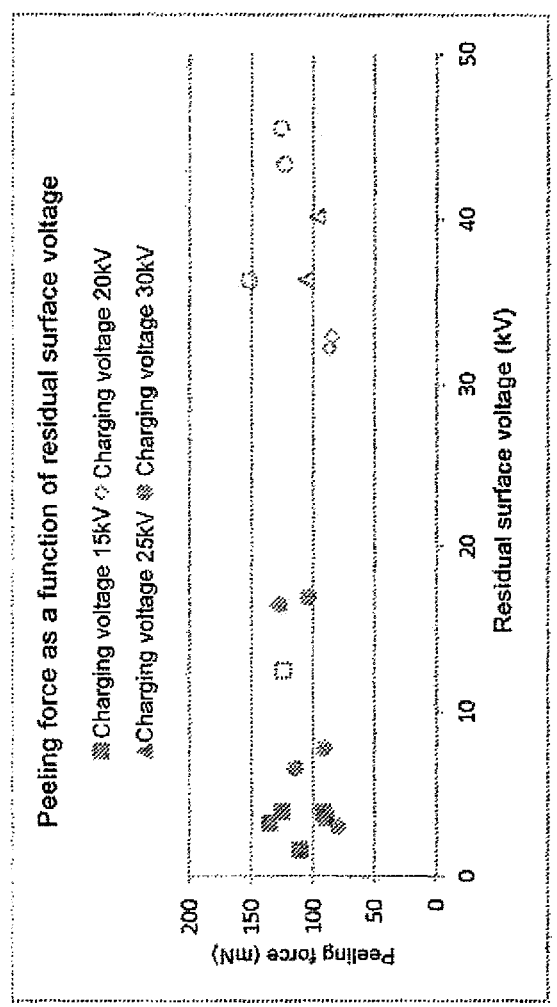
FIG. 2 shows the results of peeling force measurements.

FIG. 2 shows the various measurements taken: all of the unfilled-in marks were measured immediately after the charge generation step.

The initial charge voltage appears to have no influence on peeling performance. A given residual surface voltage may correspond to various initial charge voltages, given that surface voltage decreases and then stabilizes over time. It is therefore possible to question the pertinence of measuring residual voltage in the first few minutes after charging. The result is subjected to variations that are too great in that time interval.

In conclusion, it can be seen that:
the residual surface voltage decreases quickly in the first few minutes after charging and stabilizes at a low level, with this applying regardless of the initial charge;
the voltage of the initial charge, providing it is at least 15 kV, turns out to have no influence on the peeling performance, providing the peeling test is performed several tens of minutes after charging; and
in the tests performed, the measured peeling force was on average equal to 11 g (i.e. 107.9 mN)±30%.

Comparable results have been obtained with other types of plastics film as the support layer, and in particular with a polyester film of trademark Airtech® (reference: WL3800) having a thickness of 50 μm.

The invention claimed is:

1. A multilayer element comprising a reinforcing material adapted to making composite parts associated on at least one of its faces with a support layer, the reinforcing material and the support layer being associated with each other by electrostatic forces, wherein, the reinforcing material does not present an adhesive nature at temperatures in the range 18° to 25° C.; and wherein, the reinforcing material consisting essentially of reinforcing fibers and by thermoplastic material, the weight of the thermoplastic material representing not more than 10% of the total weight of the reinforcing, and wherein, the electrostatic forces associating the reinforcing material with the support layer corresponds to a peeling force lying in the range 50 to 1000 mN; and wherein, the electrostatic forces associating the reinforcing material with the support layer correspond to a residual charge of voltage lying in the range 0.1 to 3 kV.

2. A multilayer element according to claim 1 wherein, the reinforcing material comprises one or more woven, non-woven, or unidirectional material fabrics comprising fibers selected from the group consisting of glass fibers, carbon fibers, aramid fibers and ceramic fibers.

3. A multilayer element according to claim 1 wherein the support layer has a thickness lying in the range 10 to 500 μm.

4. A multilayer element according to claim 1, wherein the support layer is made of an electrically insulating material.

5. A multilayer element according to claim 4, wherein the support layer presents resistivity lying in the range $10^8$ to $10^{17}$ Ω·m.

6. A multilayer element according to claim 1 wherein the reinforcing material includes a thermoplastic binder.

7. A multilayer element according to claim 6, wherein the support layer comprises polyethylene terephthalate.

* * * * *